United States Patent
Natsumeda et al.

(10) Patent No.: US 8,421,292 B2
(45) Date of Patent: Apr. 16, 2013

(54) PERMANENT MAGNET MOTOR HAVING COMPOSITE MAGNETS AND MANUFACTURING METHOD THEREOF

(75) Inventors: Mitsutoshi Natsumeda, Osaka (JP); Yoshinori Takayama, Osaka (JP); Motoharu Shimizu, Osaka (JP)

(73) Assignee: Hitachi Metals, Ltd., Tokyo (JP)

( * ) Notice: Subject to any disclaimer, the term of this patent is extended or adjusted under 35 U.S.C. 154(b) by 299 days.

(21) Appl. No.: 12/593,107

(22) PCT Filed: Mar. 25, 2008

(86) PCT No.: PCT/JP2008/055582
§ 371 (c)(1), (2), (4) Date: Sep. 25, 2009

(87) PCT Pub. No.: WO2008/123251
PCT Pub. Date: Oct. 16, 2008

(65) Prior Publication Data
US 2010/0109468 A1 May 6, 2010

(30) Foreign Application Priority Data
Mar. 27, 2007 (JP) .................. 2007-081263

(51) Int. Cl.
*H02K 21/38* (2006.01)
*H01F 1/03* (2006.01)
*C21D 5/06* (2006.01)

(52) U.S. Cl.
USPC ............ 310/156.43; 310/156.44; 310/156.45; 310/156.46; 310/156.47; 148/101; 148/122; 148/302

(58) Field of Classification Search ............ 310/156.43–156.47; 148/110–113
See application file for complete search history.

(56) References Cited

U.S. PATENT DOCUMENTS

| | | | |
|---|---|---|---|
| 4,110,718 A * | 8/1978 | Odor et al. ................ 335/296 |
| 5,383,978 A | 1/1995 | Yamamoto et al. | |
| 7,064,465 B2 * | 6/2006 | Huang et al. ............ 310/156.43 |
| 7,488,394 B2 | 2/2009 | Nakamura et al. | |
| 7,843,100 B2 * | 11/2010 | Blissenbach et al. .... 310/156.53 |

(Continued)

FOREIGN PATENT DOCUMENTS

| | | |
|---|---|---|
| EP | 1 843 360 A1 | 10/2007 |
| JP | 57-148566 A | 9/1982 |

(Continued)

OTHER PUBLICATIONS

Partial translation of JP01117303, Kaino et al. May 1989 p. 2 and p. 4.*

(Continued)

*Primary Examiner* — Tran N. Nguyen
*Assistant Examiner* — Terrance Kenerly
(74) *Attorney, Agent, or Firm* — Keating & Bennett, LLP (57) ABSTRACT

A permanent magnet motor includes: a rotor and a stator; and a plurality of permanent magnets placed on either the rotor or the stator. Each permanent magnet is an R—Fe—B based rare-earth sintered magnet including a light rare-earth element RL (at least one of Nd and Pr) as a major rare-earth element R, and partially includes a high coercivity portion in which a heavy rare-earth element RH (at least one element selected from the group consisting of Dy, Ho and Tb) is diffused in a relatively higher concentration than in the other portion.

11 Claims, 7 Drawing Sheets

U.S. PATENT DOCUMENTS

| | | | |
|---|---|---|---|
| 2004/0145263 A1* | 7/2004 | Kojima et al. | 310/156.23 |
| 2006/0213585 A1* | 9/2006 | Nakamura et al. | 148/302 |
| 2008/0286595 A1* | 11/2008 | Yoshimura et al. | 428/548 |
| 2009/0020193 A1 | 1/2009 | Ohta et al. | |
| 2010/0219712 A1* | 9/2010 | Kogure et al. | 310/156.43 |

FOREIGN PATENT DOCUMENTS

| | | | |
|---|---|---|---|
| JP | 58-029358 A | | 2/1983 |
| JP | 58-174977 U | | 11/1983 |
| JP | 59-117281 U | | 8/1984 |
| JP | 61-059705 A | | 3/1986 |
| JP | 01117303 | * | 5/1989 |
| JP | 05-135976 A | | 6/1993 |
| JP | 08-340651 A | | 12/1996 |
| JP | 2003282213 | * | 3/2003 |

OTHER PUBLICATIONS

Machine translation of JP2003282213, Sagawa, Mar. 2003.*

Official Communication issued in corresponding International Patent Application No. PCT/JP2008/055582 mailed on Oct. 29, 2009.

Official Communication issued in International Patent Application No. PCT/JP2008/055582, mailed on Jul. 1, 2008.

* cited by examiner

PERMANENT MAGNET MOTOR HAVING COMPOSITE MAGNETS AND MANUFACTURING METHOD THEREOF

BACKGROUND OF THE INVENTION

1. Field of the Invention

The present invention relates to a permanent magnet motor provided with an R—Fe—B based rare-earth sintered magnet that includes crystal grains of an $R_2Fe_{14}B$ type compound (where R is a rare-earth element) as a main phase.

2. Description of the Related Art

An R—Fe—B based rare-earth sintered magnet, including an $R_2Fe_{14}B$ type compound as a main phase, is known as a permanent magnet with the highest performance, and has been used in various types of motors such as a voice coil motor (VCM) for a hard disk drive and a motor for a hybrid vehicle and in numerous types of consumer electronic appliances. When used in motors and the like, the R—Fe—B based rare-earth sintered magnet should exhibit thermal resistance and coercivity ($H_{cJ}$) that are high enough to withstand an operating environment at an elevated temperature.

However, the remanence ($B_r$) and the coercivity ($H_{cJ}$) are generally conflicting properties: when it is intended to increase the coercivity of the entire permanent magnet, the remanence of the entire permanent magnet will relatively decrease.

An alloy in which a light rare-earth element RL such as Nd is partly replaced with a heavy rare-earth element RH such as Dy and Tb is conventionally used to increase the coercivity ($H_{cJ}$). However, with the conventional technique, the decrease in remanence ($B_r$) is still unavoidable. It should also be noted that use of the heavy rare-earth element RH such as Dy and Tb, which is a rare metal, is preferably cut down as much as possible.

To address the problem described above, Japanese Laid-Open Patent Publication No. 57-148566 and Japanese Laid-Open Patent Publication No. 8-340651 disclose that the coercivity ($H_{cJ}$) could be selectively increased for the portion of a permanent magnet used in a motor, on which a large demagnetizing field acts due to a temperature rise, armature reaction and the like during operation of the motor. According to this technique, a permanent magnet with an especially enhanced coercivity ($H_{cJ}$) is joined to another permanent magnet with an adhesive or the like.

The inventions disclosed in Japanese Laid-Open Patent Publication No. 57-148566 and Japanese Laid-Open Patent Publication No. 8-340651 may produce some degree of effect because the decrease in the remanence of the permanent magnet as a whole is minimized. However, the remanence greatly decreases in the portion of the magnet with an enhanced coercivity, compared with the other portion thereof. For this reason, the remanence sharply changes in the enhanced-coercivity portion, and hence when used in a motor and the like, the magnet will cause problems such as decrease in torque, increase in torque ripple and resultant occurrence of noise.

SUMMARY OF THE INVENTION

To overcome the problems described above, preferred embodiments of the present invention provide a permanent magnet motor that is highly resistant to a demagnetizing field, in which, although the use of a heavy rare-earth element RH that is a rare metal is reduced, the rotational torque is not decreased and the occurrence of vibration and noise is reduced, compared with the conventional motors.

A permanent magnet motor according to a preferred embodiment of the present invention includes: a rotor and a stator; and a plurality of permanent magnets placed on either the rotor or the stator, wherein each of the permanent magnets is an R—Fe—B based rare-earth sintered magnet including a light rare-earth element RL (at least one of Nd and Pr) as a major rare-earth element R, and partially includes a high coercivity portion in which a heavy rare-earth element RH (at least one element selected from the group consisting of Dy, Ho and Tb) is diffused in a relatively higher concentration than in the other portion.

In one preferred embodiment, the concentration of the heavy rare-earth element RH included in the high coercivity portion has a gradient decreasing from the surface of the permanent magnet toward the inside of the permanent magnet.

In another preferred embodiment, the high coercivity portion is integrated with the portion other than the high coercivity portion in the permanent magnet.

In still another preferred embodiment, the high coercivity portion is formed in a region of the permanent magnet on which a demagnetizing field acts most strongly during operation of the permanent magnet motor.

In yet another preferred embodiment, the permanent magnet has, as a main phase, crystal grains of an $R_2Fe_{14}B$ type compound including a light rare-earth element RL as a major rare-earth element R, and the heavy rare-earth element RH included in the high coercivity portion is distributed in a relatively higher concentration at grain boundaries of the crystal grains of the $R_2Fe_{14}B$ type compound than inside the crystal grains of the $R_2Fe_{14}B$ type compound.

A method for manufacturing a permanent magnet motor according to another preferred embodiment of the present invention includes the steps of: preparing a plurality of permanent magnets each of which is an R—Fe—B based rare-earth sintered magnet including a light rare-earth element RL (at least one of Nd and Pr) as a major rare-earth element R, and partially includes a high coercivity portion in which a heavy rare-earth element RH (at least one element selected from the group consisting of Dy, Ho and Tb) is diffused in a relatively higher concentration than in the other portion; and placing the plurality of permanent magnets on either a rotor or a stator.

In one preferred embodiment, the step of preparing a plurality of permanent magnets includes the steps of: preparing an R—Fe—B based rare-earth sintered magnet including a light rare-earth element RL as a major rare-earth element R; and forming a high coercivity portion by diffusing a heavy rare-earth element RH (at least one element selected from the group consisting of Dy, Ho and Tb) from a specific region of the surface of the R—Fe—B based rare-earth sintered magnet toward the inside of the magnet.

According to a preferred embodiment of the present invention, the heavy rare-earth element RH is diffused, not over the entire of the R—Fe—B based rare-earth sintered magnet, but selectively in a specific portion on which a large demagnetizing field acts during operation of a motor and the like. Hence, the coercivity can be enhanced with the decrease in remanence being minimized. As a result, the occurrence of vibration and noise can be reduced without causing a decrease in rotational torque, compared with the conventional case. Also, the amount of the heavy rare-earth element RH used can be reduced.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, preferred embodiments of a permanent magnet motor according to the present invention will be described. The permanent magnet motors of the preferred embodiments are herein described as an 8-pole, 12-slot, 3-phase brushless motor. It should however be noted that the motors according to preferred embodiments of the present invention are not limited to such a motor.

Figure 1A:
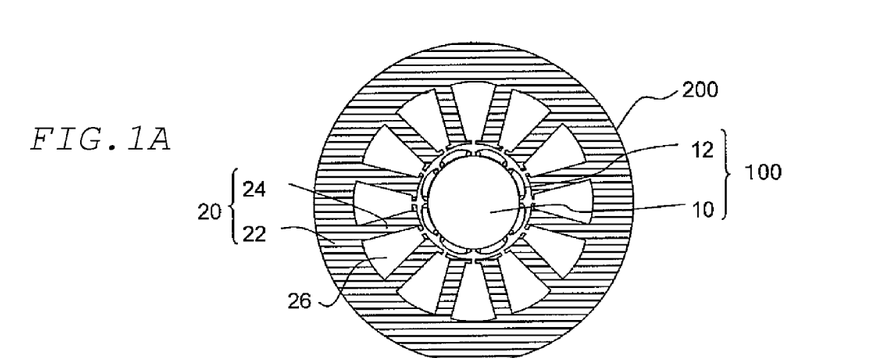
FIG. 1A is a view showing a preferred embodiment of a permanent magnet motor according to the present invention.
Figure 1B:
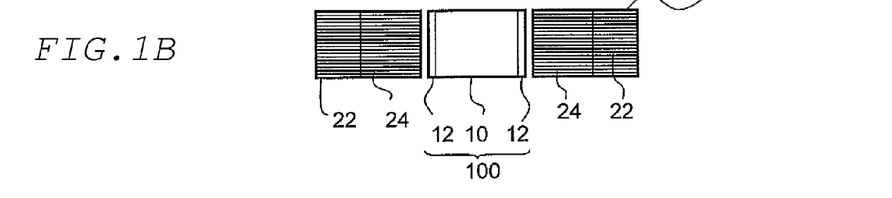
FIG. 1B is a schematic cross-sectional view thereof.

First, reference is made to FIGS. 1A and 1B, which show a rotor 100 and a stator 200 as main components of the motor of the present preferred embodiment.

The rotor 100 in this preferred embodiment includes a rotor core 10 and eight permanent magnets 12 arranged around the perimeter of the rotor core 10 at equal intervals. A rotation axis (not shown) placed in the center of the rotor core 10 is supported rotatably with a bearing or the like (not shown). The rotor core 10 is formed by stacking silicon-added non-oriented electromagnetic steel sheets on top of each other, for example. The permanent magnets 12 will be described later in detail.

The stator 200 includes a stator core 20 formed by stacking silicon-added non-oriented electromagnetic steel sheets on top of each other, for example. The stator core 20 has a ring-shaped base 22 and a total of 12 teeth 24 protruding from the base 22 toward the rotation axis. Coils (not shown) for formation of a rotating magnetic field in the stator 200 are wound in slots 26 formed between the adjacent teeth 24. In this preferred embodiment, the number of turns of the coil is about 250 for each tooth 24, for example. By applying an exciting current through the coil, a magnetic path is formed through the rotor 100 and the stator 200. The coils in this preferred embodiment are coupled to a control circuit not shown by 3-phase Y (star) connection, in which four teeth 24 are connected in series for one phase.

Next, the configuration of the permanent magnet 12 in this preferred embodiment will be described.

Figure 2A:
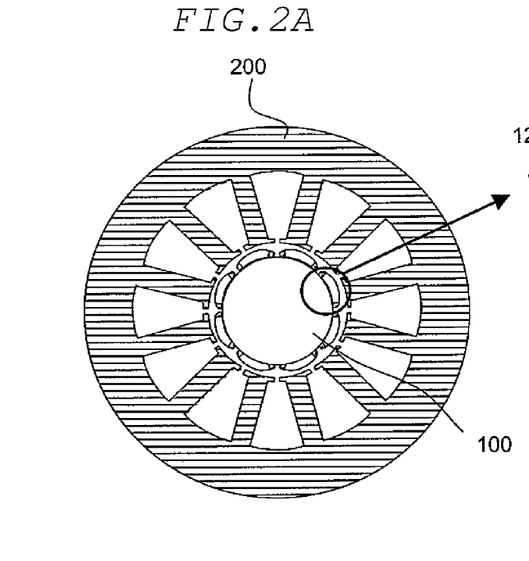
FIG. 2A is a view showing a main portion of a preferred embodiment.
Figure 2B:
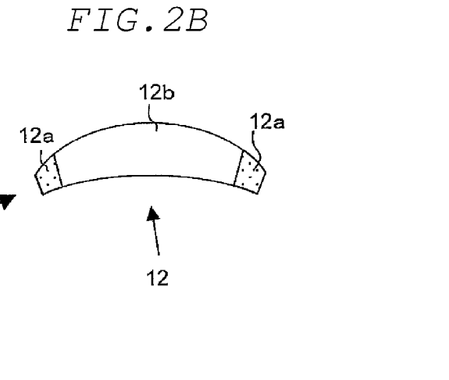
FIG. 2B is a view showing a configuration of a permanent magnet used in a preferred embodiment.

The permanent magnet 12 in this preferred embodiment is an R—Fe—B based rare-earth sintered magnet including a light rare-earth element RL (at least one of Nd and Pr) as a major rare-earth element R. A feature of the permanent magnet 12 is that, as shown in FIGS. 2A and 2B, it includes high coercivity portions 12a having a heavy rare-earth element RH (at least one element selected from the group consisting of Dy, Ho and Tb) diffused in a relatively higher concentration than the other portion. As used herein, the portion of the permanent magnet 12 other than the high coercivity portions 12a is sometimes referred to as a low coercivity portion 12b.

The permanent magnet 12 includes crystal grains of an $R_2Fe_{14}B$ type compound, which includes a light rare-earth element RL as a major rare-earth element R, as a main phase. In this permanent magnet, the heavy rare-earth element RH included in the high coercivity portions 12a is distributed in a relatively higher concentration at the grain boundaries of the crystal grains of the $R_2Fe_{14}B$ type compound than inside the crystal grains of the $R_2Fe_{14}B$ type compound. Hence, the decrease in remanence Br is minimized, and the coercivity is enhanced efficiently. The reason for this is that the heavy rare-earth element RH has migrated from the surface of the base magnet including a light rare-earth element RL as a major rare-earth element R inwardly by grain boundary diffusion. As a result, the concentration of the heavy rare-earth element RH included in the high coercive portions 12a has a gradient decreasing from the surface of the permanent magnet 12 inwardly.

In the permanent magnet 12 configured as described above, the high coercivity portions 12a are integrated with the portion (low coercivity portion 12b) other than the high coercivity portion 12a: i.e., these portions 12a and 12b are integral inside one magnet. As will be described later, the high coercivity portions 12a are located in regions including the portions of the permanent magnet 12 on which a demagnetizing field acts most strongly during operation of the permanent magnet motor.

Figure 3:
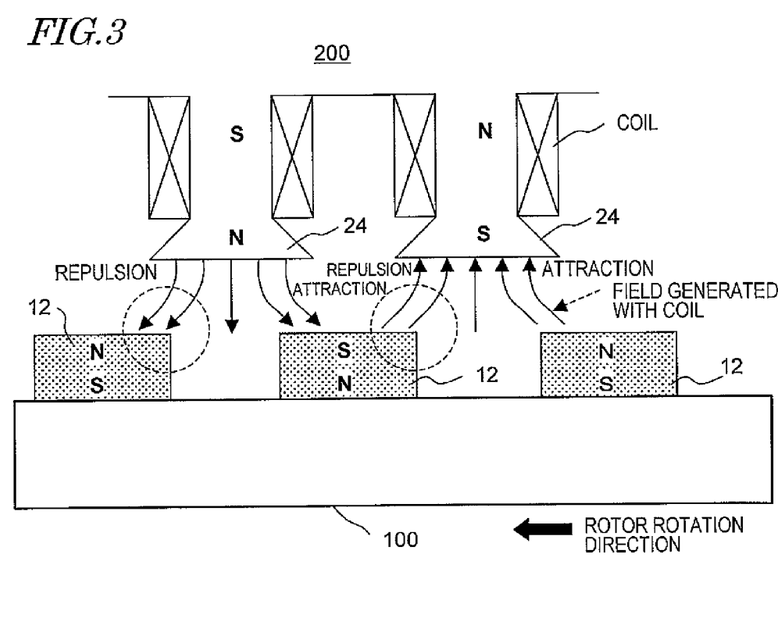
FIG. 3 schematically shows magnetic fields (magnetic fluxes) generated with coils of a stator 200.

Referring to FIG. 3, the portions of the permanent magnet 12 on which a demagnetizing field acts most strongly will be described. FIG. 3 schematically shows magnetic fields (fluxes) generated with the coils of the stator 200. Assume that the rotor 100 rotates from the right to the left as viewed from FIG. 3. For simplification, in FIG. 3, only a portion of the circumferential surface region of the rotor 100 is taken and illustrated as if it is a flat surface. In FIG. 3, also, only three permanent magnets 12 are shown.

At the position shown in FIG. 3, a flux from a tooth 24 enters the upper-left end portion of the corresponding permanent magnet 12, causing the force of attraction. Contrarily, at the upper-right end portion of the permanent magnet 12, the force of repulsion occurs because the magnetic field of the corresponding coil is in a direction opposite to the magnetization direction of the permanent magnet 12. Since the direction of the current flowing through the coils of the stator 200 is reversed with the rotation of the rotor 100, the force of attraction occurs at the upper-left end portions of all the permanent magnets 12 while the force of repulsion occurs at the upper-right end portions thereof. In this way, the rotational force is imparted to the rotor 100.

When the rotation direction of the rotor 100 is fixed, the demagnetizing field (force of repulsion) will always act on given one end portion of each of the permanent magnets 12. When the rotor 100 is rotated also in the opposite direction, the force of repulsion will act on either one of the end portions of each of the permanent magnets 12 depending on the rotation direction.

Hence, the high coercivity portion 12a should only be placed in the portion on which the strongest demagnetizing field (force of repulsion) acts, and does not have to be placed in a region on which only a weak demagnetizing field acts and a region on which no demagnetizing field acts.

For the reason described above, the heavy rare-earth element RH such as Dy is selectively diffused in a specific portion of each permanent magnet included within each dotted circle in FIG. 3, to thereby relatively enhance the coercivity of the portion. More specifically, when the rotor 100 is rotated in both directions, the high coercivity portion 12a must be provided at each of both end portions of the permanent magnet 12 as shown in FIG. 2. When the rotor 100 rotates in a fixed direction, the high coercivity portion 12a may only be formed in either one end portion of the permanent magnet depending on the rotation direction.

Hereinafter, a method for producing the permanent magnet 12 in this preferred embodiment will be described.

Material Alloy

First, an alloy including 25 mass % to 40 mass % of a light rare-earth element RL, 0.6 mass % to 1.6 mass % of B (boron) and Fe and inevitably contained impurities as the balance is provided. A portion of B may be replaced with C (carbon) and a portion (50 at % or less) of Fe may be replaced with another transition metal element such as Co or Ni. For various purposes, this alloy may contain about 0.01 mass % to about 1.0 mass % of at least one additive element M that is selected from the group consisting of Al, Si, Ti, V, Cr, Mn, Ni, Cu, Zn, Ga, Zr, Nb, Mo, Ag, In, Sn, Hf, Ta, W, Pb and Bi.

Such an alloy is preferably made by quenching a melt of a material alloy by a strip casting process, for example. Hereinafter, a method of making a rapidly solidified alloy by a strip casting process will be described.

First, a material alloy with the composition described above is melted by an induction heating process within an argon atmosphere to make a melt of the material alloy. Next, this melt is kept heated at about 1,350° C. and then quenched by a single roller process, thereby obtaining a flake-like alloy block with a thickness of about 0.3 mm. Then, the alloy block thus obtained is pulverized into flakes with a size of 1 mm to 10 mm before being subjected to the next hydrogen pulverization process. Such a method of making a material alloy by a strip casting process is disclosed in U.S. Pat. No. 5,383,978, for example.

Coarse Pulverization Process

Next, the material alloy block that has been coarsely pulverized into flakes is loaded into a hydrogen furnace and then subjected to a hydrogen decrepitation process (which will be sometimes referred to herein as a "hydrogen pulverization process") within the hydrogen furnace. When the hydrogen pulverization process is over, the coarsely pulverized alloy powder is preferably unloaded from the hydrogen furnace in an inert atmosphere so as not to be exposed to the air. This should prevent the coarsely pulverized powder from being oxidized or generating heat and would eventually improve the magnetic properties of the resultant magnet.

As a result of this hydrogen pulverization process, the rare-earth alloy is pulverized to sizes of about 0.1 mm to several millimeters with a mean particle size of 500 μm or less. After the hydrogen pulverization, the decrepitated material alloy is preferably further crushed to finer sizes and cooled. If the material alloy unloaded still has a relatively high temperature, then the alloy should be cooled for a longer time.

Fine Pulverization Process

Next, the coarsely pulverized powder is finely pulverized with a jet mill pulverizing machine. A cyclone classifier is connected to the jet mill pulverizing machine for use in this preferred embodiment. The jet mill pulverizing machine is fed with the rare-earth alloy that has been coarsely pulverized in the coarse pulverization process (i.e., the coarsely pulverized powder) and gets the powder further pulverized by its pulverizer. The powder, which has been pulverized by the pulverizer, is then collected in a collecting tank by way of the cyclone classifier. In this manner, a finely pulverized powder with sizes of about 0.1 μm to about 20 μm (typically 3 μm to 5 μm) can be obtained. The pulverizing machine for use in such a fine pulverization process does not have to be a jet mill but may also be an attritor or a ball mill. Optionally, a lubricant such as zinc stearate may be added as an aid for the pulverization process.

Press Compaction Process

In this preferred embodiment, 0.3 wt % of lubricant is added to, and mixed with, the magnetic powder, obtained by the method described above, in a rocking mixer, thereby coating the surface of the alloy powder particles with the lubricant. Next, the magnetic powder prepared by the method described above is compacted under an aligning magnetic field using a known press machine. The aligning magnetic field to be applied may have a strength of 1.5 to 1.7 tesla (T), for example. Also, the compacting pressure is set such that the green compact has a green density of about 4 g/cm$^3$ to about 4.5 g/cm$^3$.

Sintering Process

The powder compact described above is preferably sequentially subjected to the process of maintaining the compact at a temperature of 650° C. to 1,000° C. for 10 to 240 minutes and then to the process of further sintering the compact at a higher temperature (of 1,000° C. to 1,200° C., for example) than in the maintaining process. Particularly when a liquid phase is produced during the sintering process (i.e., when the temperature is in the range of 650° C. to 1,000° C.), the R-rich phase on the grain boundary phase starts to melt to produce the liquid phase. Thereafter, the sintering process advances to form a sintered magnet eventually. The sintered magnet body may be machined to adjust its size.

Diffusion Process

Next, the heavy rare-earth element RH is made to diffuse and penetrate efficiently into a specific region of the sintered magnet body thus obtained (a portion of the magnet body), thereby forming a high coercivity portion in the sintered magnet body.

Figure 4:
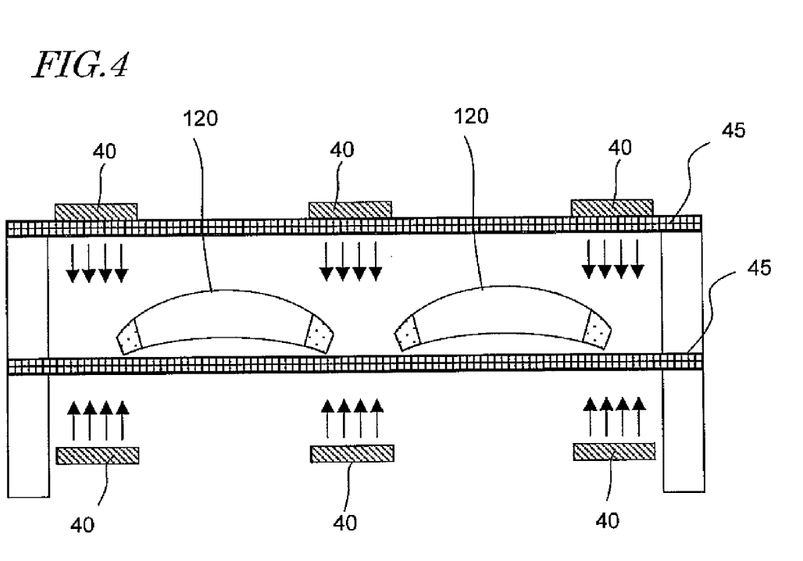
FIG. 4 is a view for demonstrating a method for producing a permanent magnet 12 in the preferred embodiment.

Hereinafter, the diffusion process of the heavy rare-earth element RH in this preferred embodiment will be described in detail with reference to FIG. 4. FIG. 4 illustrates an exemplary arrangement of sintered magnet bodies 120 produced in the processes described above and bulk bodies 40 of the heavy rare-earth element RH (RH bulk bodies). The RH bulk bodies 40 are metal sheets of Dy, for example.

In the example of FIG. 4, the sintered magnet bodies 120 and the RH bulk bodies 40 are arranged so as to face each other with a predetermined gap left between them inside a processing chamber (not shown) made of a refractory metal. In the example of FIG. 4, members 45 hold a plurality of sintered magnet bodies 120 and RH bulk bodies 40. Such holding members may be produced from a net made of Nb. The sintered magnet bodies 120 and the RH bulk bodies 40 do not have to be held in this way but may also be held using any other member.

In this preferred embodiment, in order to introduce the heavy rare-earth element RH into a specific portion of each sintered magnet body 120 preferentially, the RH bulk bodies 40 are placed so as to be near both end portions of the sintered magnet body 120. The heavy rare-earth element RH would be wasted if being diffused in the region of the sintered magnet body 120 other than the portion that is to be the high coercivity portion. To avoid this, a mask layer made of a refractory metal film and the like may be provided on the non-diffusion region. However, with the RH bulk bodies 40 placed near the end portions of the sintered magnet body 120 as shown in FIG. 4, the high coercivity portion can be easily formed as a part of the sintered magnet body.

To diffuse the heavy rare-earth element RH, the processing chamber is heated with a heater (not shown) to raise the temperature of the processing chamber. In this case, the temperature of the processing chamber is Controlled to the range of 700° C. to 1,000° C., preferably to the range of 850° C. to 950° C. In such a temperature range, the heavy rare-earth element RH such as Dy has a very low vapor pressure and hardly vaporizes. However, by arranging the sintered magnet body 120 and the RH bulk body 40 close to each other, not in contact with each other, a heavy rare-earth metal can be deposited at as low a rate as several μm per hour (e.g., in the range of 0.5 μm/hr to 5 μm/hr) on the surface of the sintered magnet body 120. Moreover, by Controlling the temperature of the sintered magnet body 120 within an appropriate range such that the temperature of the sintered magnet body 120 is equal to or higher than that of the RH bulk body 40, the heavy rare-earth element RH deposited in vapor phase can be diffused deep into the sintered magnet body 120 as it is. This temperature range is a preferred one in which the RH metal diffuses inward through the grain boundary phase of the sintered magnet body 120. As a result, slow deposition of the RH metal and quick diffusion thereof into the magnet body can be done efficiently.

In this preferred embodiment, with the vaporization and sublimation of the RH bulk body 40 minimized, the heavy rare-earth element RH that has arrived at the surface of the sintered magnet body 120 is quickly diffused inside the sintered magnet body 120. For that purpose, the gap between the sintered magnet body 120 and the RH bulk body 40 is set to fall within the range of 1 mm to 300 mm. This gap is preferably 50 mm or less, more preferably 20 mm or less, and even more preferably 10 mm or less. As long as such a distance can be kept between them, the sintered magnet bodies 120 and the RH bulk bodies 40 may be arranged either vertically or horizontally or may even be moved relative to each other.

In this preferred embodiment, the RH metal vaporizes little, but the sintered magnet body 120 and the RH bulk body 40 are arranged close to each other but not in contact with each other. That is why the RH metal vaporized can be deposited on the surface of the sintered magnet body efficiently and is hardly deposited on the wall surfaces of the processing chamber. Furthermore, if the wall surfaces of the processing chamber are made of a heat-resistant alloy including Nb, for example, a ceramic, or any other material that does not react to RH, then the RH metal deposited on the wall surfaces will vaporize again and will be deposited on the surface of the sintered magnet body after all. As a result, it is possible to avoid an unwanted situation where the heavy rare-earth element RH, which is one of valuable natural resources, is wasted in vain.

During the heat treatment process, an inert atmosphere is preferably maintained inside the processing chamber. As used herein, the "inert atmosphere" refers to a vacuum or an atmosphere filled with an inert gas. Also, the "inert gas" may be a rare gas such as argon (Ar) and helium (He) but may also be any other gas as long as the gas is not chemically reactive between the RH bulk body and the sintered magnet body. The pressure of the inert gas is reduced so as to be lower than the atmospheric pressure. If the pressure of the atmosphere inside the processing chamber were close to the atmospheric pressure, then the RH metal would not be supplied easily from the RH bulk body to the surface of the sintered magnet body. However, if the pressure of the atmosphere inside the processing chamber were sufficiently lowered, the amount of the RH metal diffused (and eventually the degree of increase in coercivity) would not change significantly with the pressure. This is because the amount of the RH metal diffused is determined by the rate of diffusion from the surface of the magnet toward the inner portion thereof. The amount of the RH metal diffused is sensitive to the temperature of the sintered magnet body, rather than the pressure.

The RH metal that has traveled to reach the surface of the sintered magnet body and then be deposited there starts to diffuse toward the inside of the magnet through the grain boundary phase under the driving forces generated by the heat of the atmosphere and the difference in RH concentration at the interface of the magnet. In the meantime, a portion of the light rare-earth element RL in the $R_2Fe_{14}B$ phase is replaced with the heavy rare-earth element RH that has diffused and penetrated from the surface of the magnet. As a result, a layer including the heavy rare-earth element RH at a high concentration is formed on the outer surface region (outermost periphery) of the $R_2Fe_{14}B$ phase.

By forming such a layer including RH at a high concentration, the magnetocrystalline anisotropy can be improved and the coercivity $H_{cJ}$ can be increased on the outer surface region of the main phase. That is to say, even by using a small amount of RH metal, the heavy rare-earth element RH can diffuse and penetrate deeper into the magnet, and the light rare-earth element RL is replaced with the heavy rare-earth element RH only on the outer surface region of the main phase. As a result, the coercivity $H_{cJ}$ can be increased in a portion (high coercivity portion) of the magnet body with the decrease in remanence $B_r$ minimized.

The diffusion process described above is not sensitive to the surface status of the sintered magnet body, and therefore, a film of Al, Zn or Sn may be deposited on the surface of the sintered magnet body before the diffusion process. This is because Al, Zn and Sn are low-melting metals and because a small amount of Al, Zn or Sn would not deteriorate the magnetic properties or would not interfere with the diffusion, either.

The RH bulk body 40 does not have to be made of a single element but may include an alloy of a heavy rare-earth element RH and an element X, which is at least one element selected from the group consisting of Nd, Pr, La, Ce, Al, Zn, Sn, Cu, Co, Fe, Ag and In. Such an element X would lower the melting point of the grain boundary phase and would hopefully promote the grain boundary diffusion of the heavy rare-earth element RH. By thermally treating, in a vacuum, the bulk body of such an alloy and an Nd sintered magnet that are spaced from each other, the heavy rare-earth element RH and the element X can be not only evaporated and deposited on the surface of the magnet but also diffused into the magnet through the grain boundary phase (Nd-rich phase) that has turned into a liquid phase preferentially.

EXAMPLE

Figures 5A, 5B:
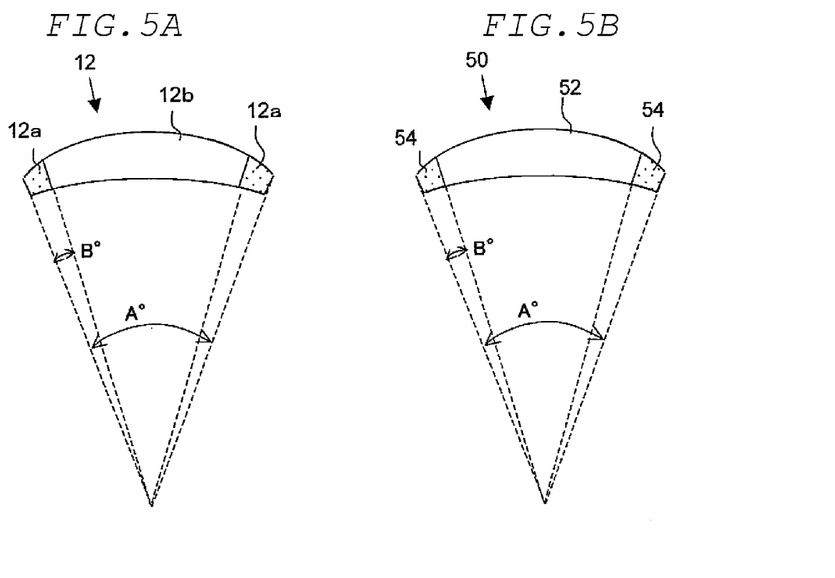
FIG. 5A is a view showing a configuration of the permanent magnet 12 used according to a preferred embodiment of the present invention.
FIG. 5B is a view showing a configuration of a composite magnet 50.

In this Example, the permanent magnet 12 in a shape shown in FIG. 5A is used. Dy is diffused in both end portions of the permanent magnet 12 as a sintered magnet body in the manner described in the above preferred embodiment. To state specifically, a base magnet (sintered magnet body) having a composition shown in Table 1 below is prepared, and 0.36 mass % of Dy is diffused in the end portions (specific regions) thereof, forming the high coercivity portions 12a. The coercivity $H_{cJ}$ of the base magnet is 1700 kA/m and the remanence $B_r$ thereof is 1.276 T (tesla), while the coercivity $H_{cJ}$ of the high coercivity portions 12a is set at 2024 kA/m and the remanence $B_r$ thereof at 1.264 T. In this way, with Dy diffused, the coercivity $H_{cJ}$ of the high coercivity portions 12a increases by about 300 kA/m compared with that of the base magnet, and the decrease in remanence $B_r$ is suppressed to 0.012 T.

TABLE 1

| | Element | | | | | | | |
|---|---|---|---|---|---|---|---|---|
| | Nd | Pr | Dy | B | Co | Al | Cu | Fe |
| Composition [wt %] | 19.4 | 6.8 | 5.0 | 1.00 | 0.90 | 0.20 | 0.10 | balance |

The size of the permanent magnet 12 of the Example is as follows. With the diameter of the rotor 100 being set at 14.5 mm, the radius of curvature of the bottom of the permanent magnet is set at 14.5 mm, and the radius of curvature of the top thereof at 7 mm. The length in the rotation axis direction is set at 30 mm, and the maximum thickness is set at 2.5 mm. It is needless to mention that the shape and size of the permanent magnet 12 are not limited to those specified above.

As shown in FIG. 5A, assume that the angle of the permanent magnet 12 formed with respect to the rotation axis (rotor center axis) is A° and the angle of one high coercivity portion 12a (Dy-diffused specific region) formed with respect to the center axis is B°.

In the permanent magnet of the Example, B/A is somewhere between more than 0% and not more than 50%. A magnet of B/A=0% (Comparative Example 1) corresponds with a known magnet in which no Dy is diffused and hence no high coercivity portion is formed. Such a magnet of Comparative Example 1 has the same magnetic properties as the "base magnet" before being subjected to the Dy diffusion, which properties are similar to the magnetic properties of the low coercivity portion 12b in the Example. The low coercivity portion 12b also includes Dy, which is however low in concentration compared with Dy in the high coercivity portion 12a and which originates from one already added in the powder alloy before the sintering process.

In this Example, Dy is selectively diffused in a specific region of the base magnet from outside, thereby integrally forming the high coercivity portion 12a in the base magnet. In relation to this, Comparative Example 2 was also examined in which two kinds of magnets were joined together. As shown in FIG. 5B, a composite magnet 50 of Comparative Example 2 includes two high coercivity magnet pieces 54 joined to both ends of a base magnet 52 with an adhesive. The base magnet 52 is made of the same material as the base magnet in the Example, but is different therefrom in having a shape of the base magnet in the Example with both ends thereof cut away. The high coercivity magnet pieces 54 in Comparative Example 2 have a composition shown in Table 2 below.

TABLE 2

| | Element | | | | | | | |
|---|---|---|---|---|---|---|---|---|
| | Nd | Pr | Dy | B | Co | Al | Cu | Fe |
| Composition [wt %] | 18.5 | 5.7 | 7.1 | 1.00 | 0.90 | 0.20 | 0.10 | Balance |

The coercivity $H_{cJ}$ of the high coercivity magnet pieces 54 is 2024 kA/m, and the remanence $B_r$ thereof is 1.225 T. As is recognized, while the coercivity $H_{cJ}$ of the high coercivity magnet pieces 54 is equal to that of the high coercivity portions 12a, the remanence $B_r$ thereof decreases by 0.039 T compared with that of the high coercivity portions 12a and by 0.051 T compared with that of the base magnet 52. Dy in the high coercivity magnet pieces 54 is not one introduced by diffusion but one already added in the material alloy powder. Hence, the decrease in remanence $B_r$ is eminent compared with the case of diffusing Dy partially from a specific surface region of the sintered magnet body.

As shown in FIG. 5B, the angle of the composite magnet 50 formed with respect to the rotation axis is set at A° and the angle of one high coercivity magnet piece 54 formed with respect to the center axis at B°. If B/A=0%, the composite magnet 50 will be equal to the base magnet (Comparative Example 1). If B/A=50%, the entire magnet will function as a high coercivity magnet having the composition in Table 2.

Figure 6:
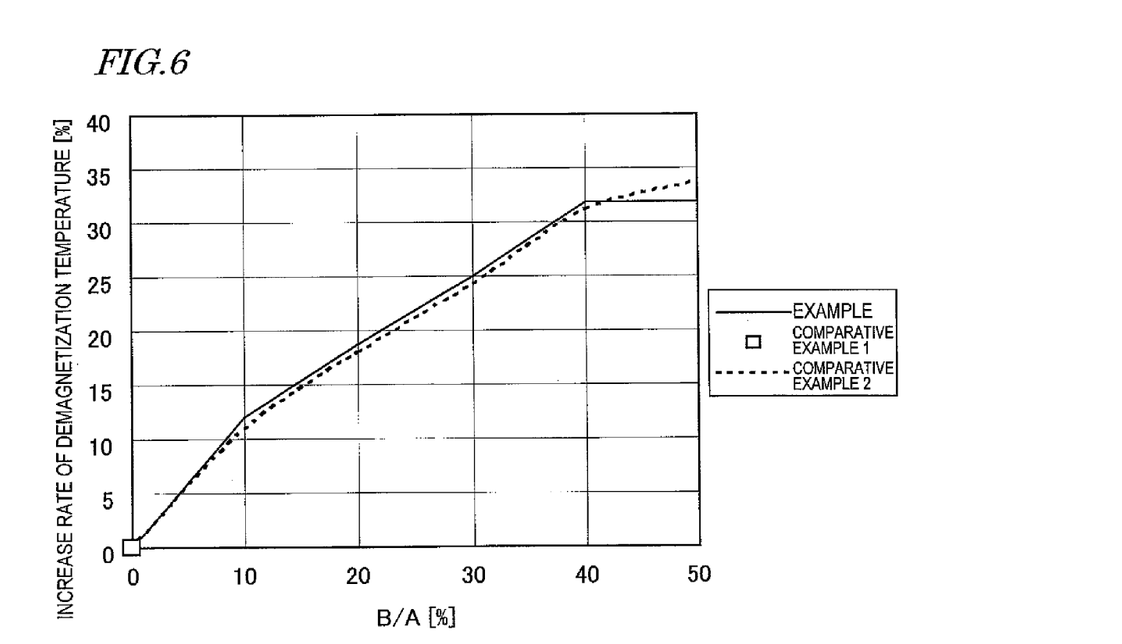
FIG. 6 is a graph showing the relationship between the "increase rate of demagnetization temperature" and the "B/A" for Example and Comparative Example 2.

FIG. 6 is a graph showing the relationship between the "increase rate of demagnetization temperature" and the "B/A" for the Example of FIGS. 5A and 5B and the composite magnet (Comparative Example 2). The data of the graph was obtained by computer simulation using the demagnetization temperature (130° C.) for the base magnet (Comparative Example 1) where B/A=0% as the reference. In the computation, the current phase angle β was set at 0° and the exciting current at 10 A/mm², based on the configuration of the motor described above with reference to FIGS. 1A and 1B. Although the actual Dy concentration of the high coercivity portions 12a has a gradient, it is assumed that the Dy concentration of the high coercivity portions 12a is uniform (0.36 mass %) for simplification of the computation.

As is found from FIG. 6, the greater the B/A is, the higher the demagnetization temperature increase rate is. When the B/A is the same, the difference in demagnetization temperature increase rate is small between the Example and the composite magnet (Comparative Example 2). This is because the high coercivity portions 12a in the Example and the high coercivity magnet pieces 54 of the composite magnet 50 are designed to have the same coercivity $H_{cJ}$ and hence are roughly equal to each other in demagnetization temperature.

Figure 7:
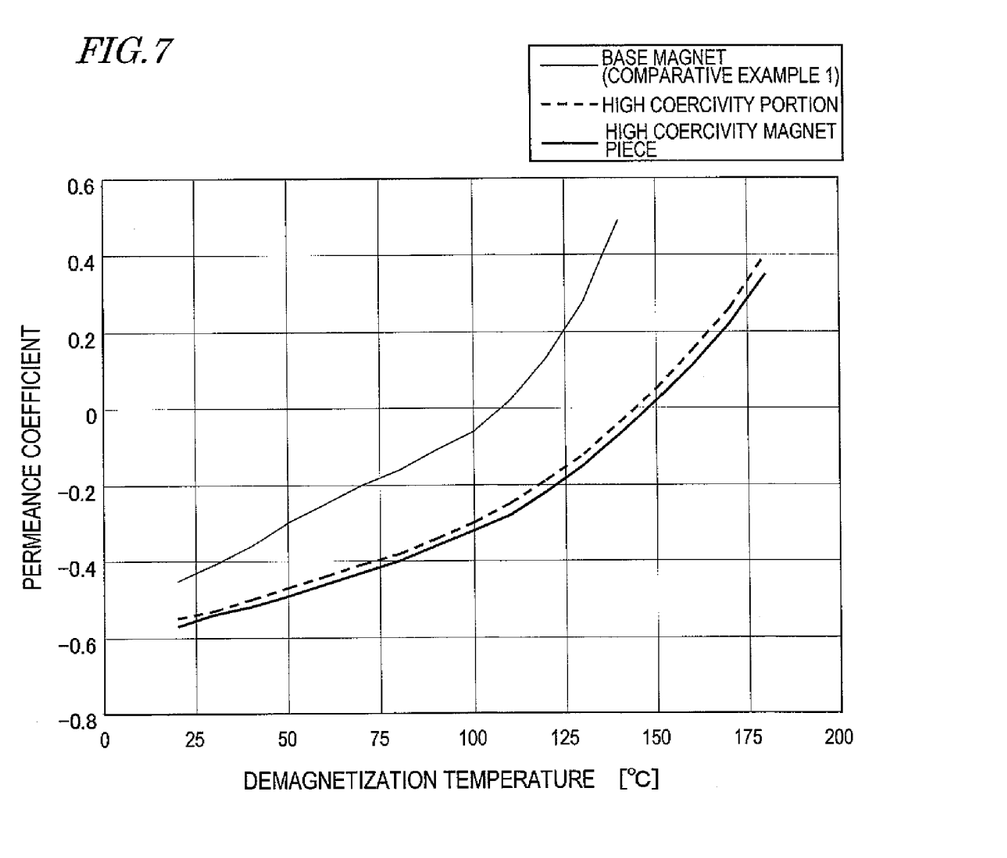
FIG. 7 is a graph showing the relationship between the "permeance coefficient" and the "demagnetization temperature" for a high coercivity portion, a base magnet and a high coercivity magnet piece.

FIG. 7 is a graph showing the relationship between the "permeance coefficient" and the "demagnetization temperature" for the high coercivity portion, the base magnet and the high coercivity magnet piece. As is found from FIG. 7, the difference in demagnetization property is negligible between the high coercivity portion in the Example and the high coercivity magnet piece of the composite magnet (Comparative Example 2). However, the demagnetization property of the base magnet (Comparative Example 1) is inferior to that of the high coercivity portion.

As shown in FIG. 6, the reason why the increase rate of the demagnetization temperature is higher as the B/A is greater is that the demagnetization temperature of the entire magnet increases with increase in the proportion of the portion high in coercivity $H_{cJ}$, i.e., the portion high in demagnetization temperature in the magnet.

It is also found from FIG. 6 that once the B/A reaches 40% or higher, the increase of the demagnetization temperature is saturated. This indicates that it is meaningless to provide the high coercivity portion 12a in such a portion of the permanent magnet 12 where no demagnetizing field is formed. It is therefore sufficient for the high coercivity portions 12a to partially occupy 80% or less of the permanent magnet 12.

The high coercivity portion 12a, a portion having an enhanced coercivity $H_{cJ}$ with the Dy diffusion, experiences a slight decrease in remanence $B_r$ with existence of Dy. In this Example, however, in which Dy spreads in the high coercivity portion 12a by grain boundary diffusion, Dy does not diffuse deep inside crystal grains (main phase) of the $R_2Fe_{14}B$ type compound. Therefore, no Dy-caused decrease in the magnetization of the main phase occurs, and hence the decrease in remanence $B_r$ is minimized. Contrarily, in Comparative Example 2, Dy exists inside the main phase of the high coercivity magnet piece 54, and resultantly the decrease in remanence $B_r$ is comparatively great. The decrease in remanence $B_r$ causes decrease in the torque of the motor. As the decrease in remanence $B_r$ is greater, the decrease rate of torque of the motor is greater.

Figure 8:
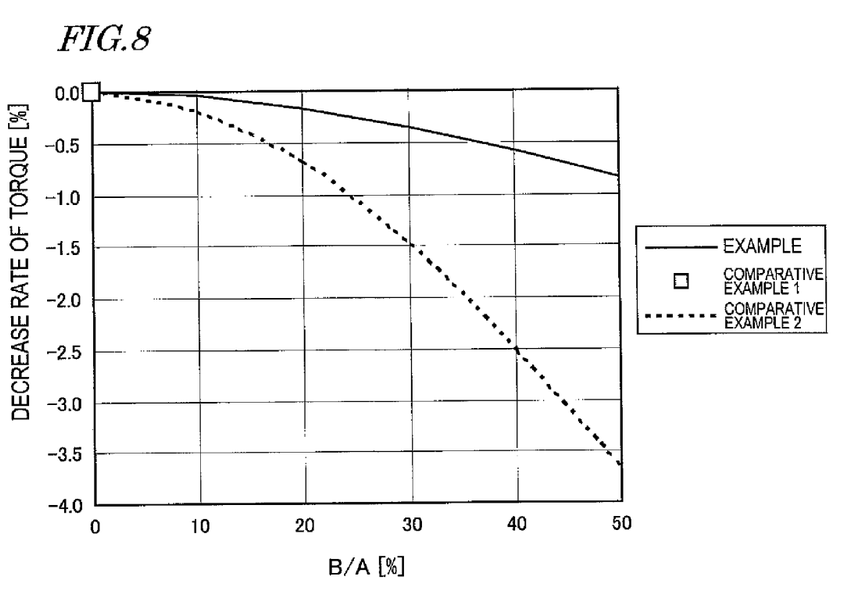
FIG. 8 is a graph showing the relationship between the "decrease rate of torque" and the "B/A" for Example and Comparative Example.

FIG. 8 is a graph showing the relationship between the "decrease rate of torque" and the "B/A" for the Example and the composite magnet (Comparative Example 2) of FIGS. 5A and 5B. The reference value of the torque is the torque value obtained when the base magnet before being subjected to Dy diffusion is used. As is found from FIG. 8, the decrease rate of torque is greater (the torque decreases more greatly) with increase of the B/A. However, in this Example, the decrease rate of torque is relatively reduced compared with the composite magnet (Comparative Example 2). This is because by introducing Dy under diffusion from the surface of the magnet, the decrease in remanence $B_r$ can be minimized in this Example compared with that in the high coercivity magnet piece.

Figure 9:
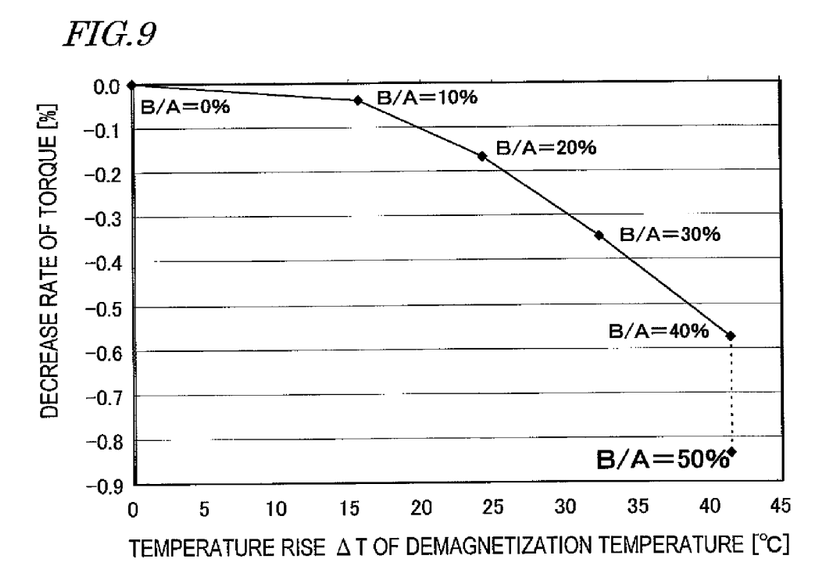
FIG. 9 is a graph showing the relationship between the "decrease rate of torque" and the "temperature rise ΔT of demagnetization temperature" for the permanent magnet 12 observed when B/A=0%, 10%, 20%, 30%, 40% and 50%.

FIG. 9 is a graph showing the relationship between the "decrease rate of torque" and the "temperature rise ΔT of demagnetization temperature" for the permanent magnet 12 with B/A=0%, 10%, 20%, 30%, 40% and 50%. As B/A is greater, the temperature rise ΔT is greater, but the rate at which the torque decreases is higher. As already described, it is meaningless to increase the B/A to 40% or more.

Figure 10:
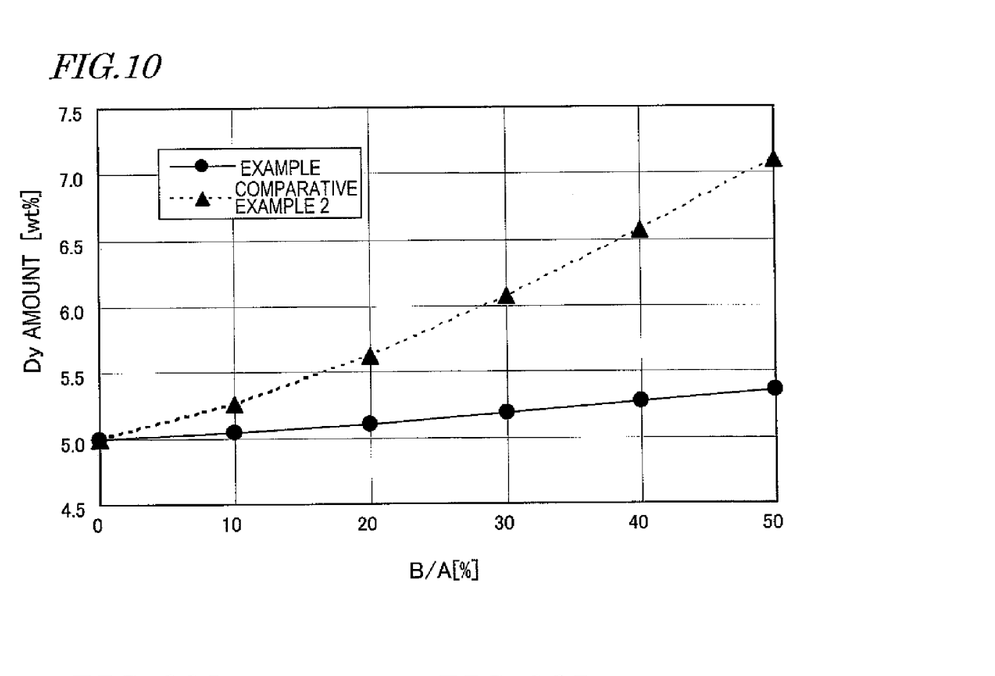
FIG. 10 is a graph showing the "Dy amount" of the permanent magnet 12 observed when B/A=0%, 10%, 20%, 30%, 40% and 50%.

FIG. 10 is a graph showing the "Dy amount" for the permanent magnet 12 with B/A=0%, 10%, 20%, 30%, 40% and 50%. It is found from this graph that the Dy amount can be greatly cut back in this Example although the demagnetization property of this Example is little different from that of the composite magnet (Comparative Example 2) as discussed earlier.

As described above, in this Example, in which Dy is diffused in a portion of the permanent magnet 12 in the manner described above with reference to FIG. 4, the effect of minimizing the decrease in remanence $B_r$ is obtained. However, the present invention is not limited to this way of Dy diffusion.

In comparison with the present invention, the composite magnet with the high coercivity magnet pieces joined to the base magnet has the following drawbacks, in addition to the one described above, and hence presents problems against its commercialization.

1) An assembly process for joining the high coercivity magnet pieces to the base magnet is necessary for the composite magnet. The manufacture cost will increase if high precision assembly is desired.

2) High precision shape and size alignment is necessary between the high coercivity magnet pieces and the base magnet, and this makes machining of the magnets difficult. If size discrepancy or misalignment occurs, adverse effects such as increase in cogging torque and torque ripple arise.

3) The composite magnet has a non-magnetic layer such as an adhesive layer inside the magnet. This degrades the magnetic properties and causes adverse effects such as increase in cogging torque and torque ripple.

Figure 11A:
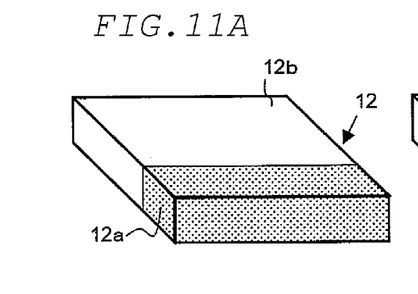
FIGS. 11A to 11D are perspective views showing various forms of a high coercivity portion 12a of the permanent magnet 12.
Figure 11B:
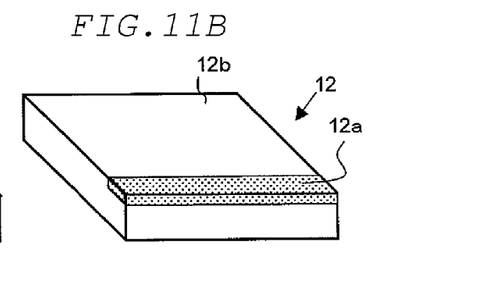
Figures 11C, 11D:
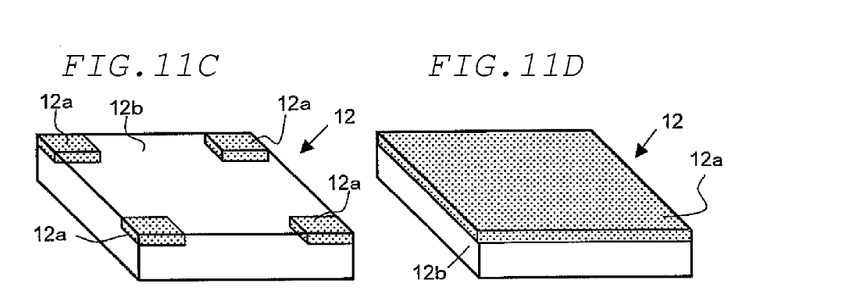

While the high coercivity portions 12a were provided at both ends of the permanent magnet 12 in the preferred embodiments and the Example described above, the present invention is not limited to this. The region in which the high coercivity portion 12a is formed can be appropriately selected depending on the structure of the permanent magnet motor and the operating conditions thereof. For example, the high coercivity portion 12a may be provided only at one end of the permanent magnet 12 as schematically shown in FIG. 11A, or may be provided only in a top region (facing the stator) of the permanent magnet 12 as shown in FIG. 11B. Otherwise, the high coercivity portion 12a may be formed in each of the four corners of the permanent magnet 12 as shown in FIG. 11C, or may expand over the entire top of the permanent magnet 12 as shown in FIG. 11D. The important point here is that the heavy rare-earth element RH is diffused in a region on which a relatively strong demagnetizing field acts during operation of the motor, thereby increasing the coercivity $H_{cJ}$ of a portion that requires high coercivity preferentially compared with that of the other portion. Demagnetization depends not only on the magnitude of the demagnetizing field but also on the temperature. Hence, it is preferred to increase the coercivity of a portion whose temperature is easy to rise even if the demagnetizing field is weak in the portion. It should be noted that, as a technique of diffusing Dy and the like in a permanent magnet, another method such as that disclosed in Japanese Laid-Open Patent Publication No. 2006-303436 may also be adopted.

The permanent magnet in the permanent magnet motor according to a preferred embodiment of the present invention includes a high coercivity portion in which the heavy rare-earth element RH (at least one element selected from the group consisting of Dy, Ho and Tb) is diffused in a relatively higher concentration than in the other portion. This high coercivity portion 12a may be a combination of a high coercivity portion 121 in which only Dy is diffused and a high coercivity portion 122 in which Tb is diffused, for example, as shown in FIGS. 12A and 12B.

Figure 12A:
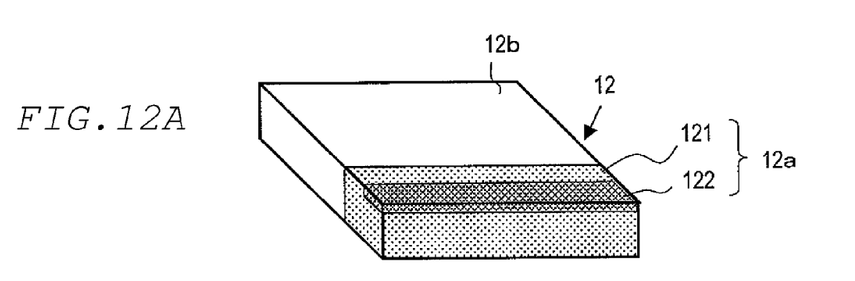
FIGS. 12A and 12B are perspective views showing examples of arrangement of a Dy-diffused high coercivity portion 121 and a Tb-diffused high coercivity portion 122 of the permanent magnet 12.
Figure 12B:
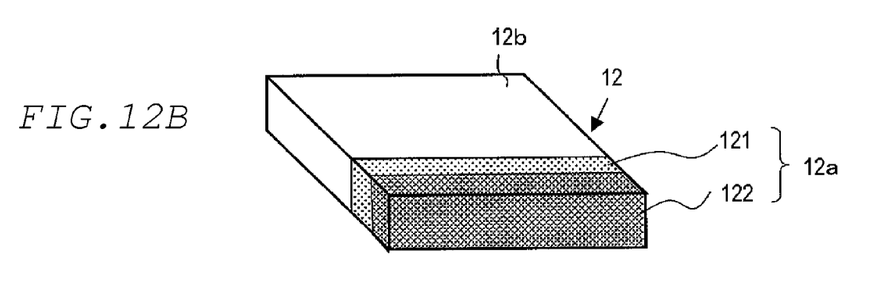

In the examples shown in FIGS. 12A and 12B, the Tb-diffused high coercivity portion 122 is formed in a region of the permanent magnet 12 in which demagnetization is especially easy to occur. Tb is higher in coercivity improving effect than Dy, but is relatively large in the degree of decrease in remanence. It is therefore preferred to selectively introduce Tb only in a region most susceptible to demagnetization. It is sufficient to diffuse Dy in a region relatively small in demagnetizing field.

As described above, the inner configuration of the high coercivity portion 12a does not have to be uniform. The optimum inner configuration and position thereof should preferably be determined appropriately depending on the distribution of the demagnetizing field. To maximize the torque obtained when the permanent magnet 12 is placed in the motor, the permanent magnet should be actually placed in the motor to measure how the demagnetizing field affects, and based on the measurement results, the inner configuration and position of the high coercivity portion 12a should be determined. Otherwise, the field analysis may be made by simulation to determine a portion most susceptible to demagnetization.

Dy and Tb may be diffused in the manner described above. In Tb diffusion, however, it is preferred to deposit a Tb film on the surface of the permanent magnet using a thin film deposition technique such as sputtering and spraying, and then diffuse Tb inside the permanent magnet from the Tb film.

According to preferred embodiments of the present invention, design with a high degree of freedom is permitted, and a rare and valuable heavy rare-earth element RH can be effectively used.

In the preferred embodiments and the Example described above, while the heavy rare-earth element RH is supplied to some region of the surface of the sintered magnet body from the RH bulk body 40 as shown in FIG. 4 in vapor phase, it is allowed to diffuse inside the magnet body. The method for forming the high coercivity portion according to the present invention is not limited to this. The heavy rare-earth element RH may be deposited on both ends of the sintered magnet body as a film or powder by sputtering or spraying, and be diffused in a specific region of the sintered magnet body from the deposited film or powder. Note however that the Dy diffusion process described in the preferred embodiments of the present invention, which can minimize the decrease in remanence $B_r$ and also uses Dy efficiently, is considered most suitable for production of the permanent magnet according to the present invention.

The permanent magnet motor according to preferred embodiments of the present invention, which is good in thermal resistance and adaptable to a high-temperature operating environment, is suitably usable as various types of motors such as a motor for a car and in numerous types of consumer electronic appliances.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A permanent magnet motor comprising:
   a rotor;
   a stator; and
   a plurality of permanent magnets located on either the rotor or the stator; wherein the permanent magnet is an R—Fe—B based rare-earth sintered magnet including light rare-earth element RL including at least one of Nd and Pr as a rare-earth element R, and partially includes a high coercivity portion in which a heavy rare-earth element RH including at least one element selected from the group consisting of Dy, Ho and Tb is diffused from a selected area of a surface of the permanent magnet in a relatively higher concentration than in other portions, the selected area of the surface of the permanent magnet defining a location of the high coercivity portion of the permanent magnet, the high coercivity portion and a portion other than the high coercivity portion being arranged at the surface of the permanent magnet; and
   an angle of the permanent magnet formed with respect to a rotation axis of the motor is A°, an angle of the high coercivity portion formed with respect to the rotation axis of the motor is B°, and B°/A° is between more than 0% and not more than 40%.

2. The permanent magnet motor of claim 1, wherein the concentration of the heavy rare-earth element RH included in the high coercivity portion has a gradient decreasing from the surface of the permanent magnet toward an inside of the permanent magnet.

3. The permanent magnet motor of claim 2, wherein in the permanent magnet, the high coercivity portion is integrated with the portion other than the high coercivity portion.

4. The permanent magnet motor of claim 3, wherein the high coercivity portion is formed in a region of the permanent magnet on which a demagnetizing field acts most strongly during operation of the permanent magnet motor.

5. The permanent magnet motor of claim 4, wherein the permanent magnet has, as a main phase, crystal grains of an $R_2Fe_{14}B$ type compound including a light rare-earth element RL as a rare-earth element R, and the heavy rare-earth element RH included in the high coercivity portion is distributed in a relatively higher concentration at grain boundaries of the crystal grains of the $R_2Fe_{14}B$ type compound than inside the crystal grains of the $R_2Fe_{14}B$ type compound.

6. The permanent magnet motor of claim 1, wherein the R—Fe—B based rare-earth sintered magnet is produced by sintering a single powder compact.

7. The permanent magnet motor of claim 1, wherein the high coercivity portion is produced by supplying the heavy rare-earth element RH from a bulk body including the heavy rare-earth element RH that is not in contact with the surface of the permanent magnet.

8. A method for manufacturing a permanent magnet motor, the method comprising the steps of:
   preparing a plurality of permanent magnets each of which is an R—Fe—B based rare-earth sintered magnet including a light rare-earth element RL including at least one of Nd and Pr as a rare-earth element R, and partially including a high coercivity portion in which a heavy rare-earth element RH including at least one element selected from the group consisting of Dy, Ho and Tb is diffused in a relatively higher concentration than in the other portion, the high coercivity portion and a portion other than the high coercivity portion being arranged at a surface of the permanent magnet; and
   placing the plurality of permanent magnets on either a rotor or a stator; wherein the step of preparing a plurality of permanent magnets comprises the steps of:
      preparing an R—Fe—B based rare-earth sintered magnet including a light rare-earth element RL as a rare-earth element R; and
      forming a high coercivity portion by diffusing the heavy rare-earth element RH from a selected area of the surface of the R—Fe—B based rare-earth sintered magnet toward an inside of the magnet, the selected area of the surface of the permanent magnet defining a location of the high coercivity portion of the permanent magnet, the high coercivity portion and a portion other than the high coercivity portion being arranged at the surface of the permanent magnet; and
   the step of forming the high coercivity portion comprises:
      forming a mask layer having an opening that defines the selected area of the surface of the permanent magnet; and
      heating and vaporizing a bulk body including the heavy rare-earth element RH and diffusing the heavy rare-earth element into the selected area of the surface of the permanent magnet through the opening of the mask layer, the bulk body not being in contact with the surface of the permanent magnet.

9. The method of claim 8, wherein the step of forming the high coercivity portion comprises:

arranging the R—Fe—B based rare-earth sintered magnet and a bulk body including the heavy rare-earth element RH inside a processing chamber so as to face each other with a predetermined gap left between the R—Fe—B based rare-earth sintered magnet and the bulk body; and heating the processing chamber to vaporize the bulk body and diffuse the heavy rare-earth element into the selected area of the surface of the permanent magnet.

10. A method for manufacturing a permanent magnet motor, the method comprising the steps of:

preparing a plurality of permanent magnets each of which is an R—Fe—B based rare-earth sintered magnet including a light rare-earth element RL including at least one of Nd and Pr as a rare-earth element R, and partially including a high coercivity portion in which a heavy rare-earth element RH including at least one element selected from the group consisting of Dy, Ho and Tb is diffused in a relatively higher concentration than in the other portion, the high coercivity portion and a portion other than the high coercivity portion being arranged at a surface of the permanent magnet; and placing the plurality of permanent magnets on either a rotor or a stator; wherein the step of preparing a plurality of permanent magnets comprises the steps of:

preparing an R—Fe—B based rare-earth sintered magnet including a light rare-earth element RL as a rare-earth element R; and forming a high coercivity portion by diffusing the heavy rare-earth element RH from a selected area of the surface of the R—Fe—B based rare-earth sintered magnet toward an inside of the magnet, the selected area of the surface of the permanent magnet defining a location of the high coercivity portion of the permanent magnet, the high coercivity portion and a portion other than the high coercivity portion being arranged at the surface of the permanent magnet; and an angle of the permanent magnet formed with respect to a rotation axis of the motor is A°, an angle of the high coercivity portion formed with respect to the rotation axis of the motor is B°, and B°/A° is between more than 0% and not more than 40%.

11. The method of claim 10, wherein the step of forming the high coercivity portion comprises:

arranging the R—Fe—B based rare-earth sintered magnet and a bulk body including the heavy rare-earth element RH inside a processing chamber so as to face each other with a predetermined gap left between the R—Fe—B based rare-earth sintered magnet and the bulk body; and heating the processing chamber to vaporize the bulk body and diffuse the heavy rare-earth element into the selected area of the surface of the permanent magnet.

* * * * *